W. A. BROWN.
AUTOGRAPHIC CAMERA.
APPLICATION FILED APR. 30, 1919.
1,402,833.
Patented Jan. 10, 1922.
2 SHEETS—SHEET 1.
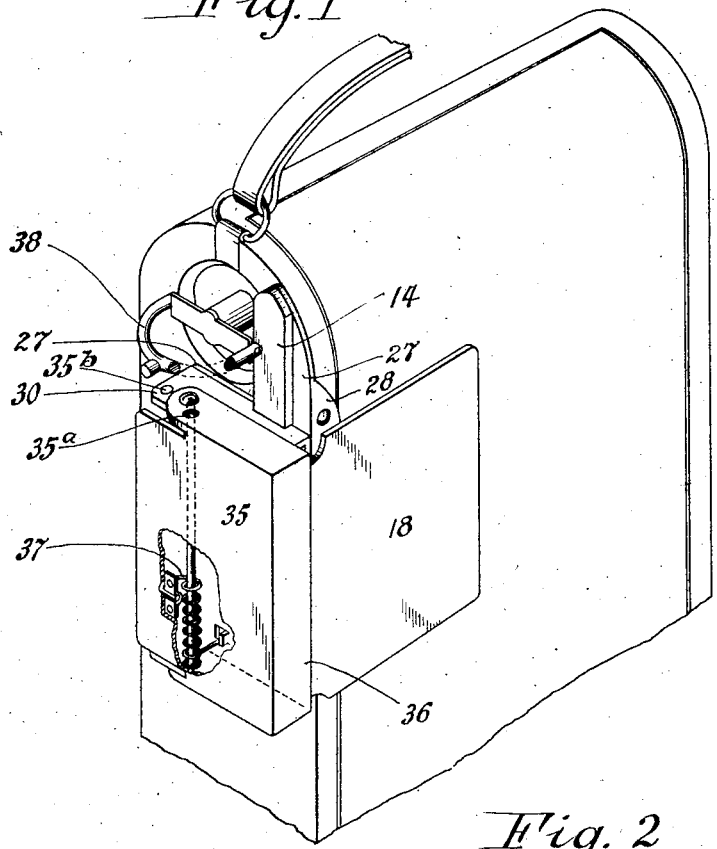
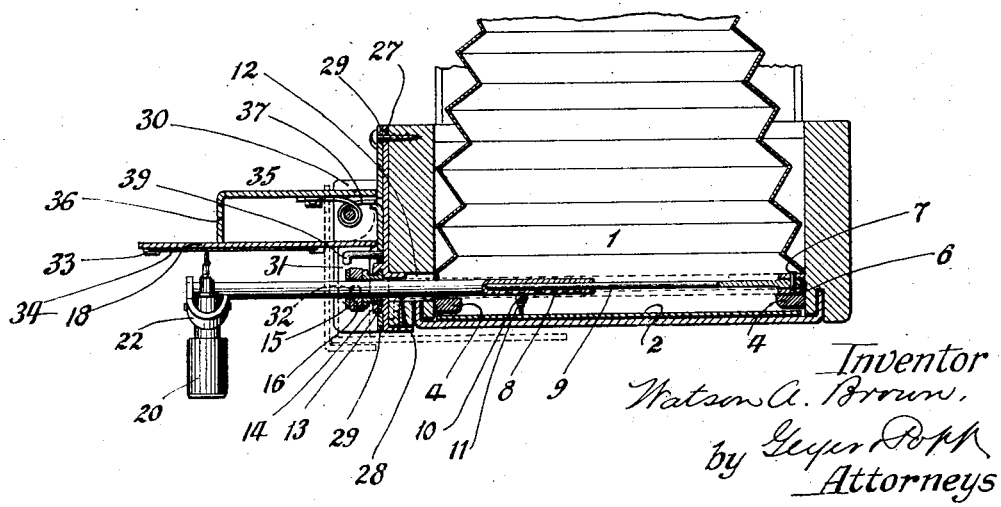
Inventor
Watson A. Brown,
by Geyer Popp
Attorneys W. A. BROWN.
AUTOGRAPHIC CAMERA.
APPLICATION FILED APR. 30, 1919.
1,402,833.
Patented Jan. 10, 1922.
2 SHEETS—SHEET 2.
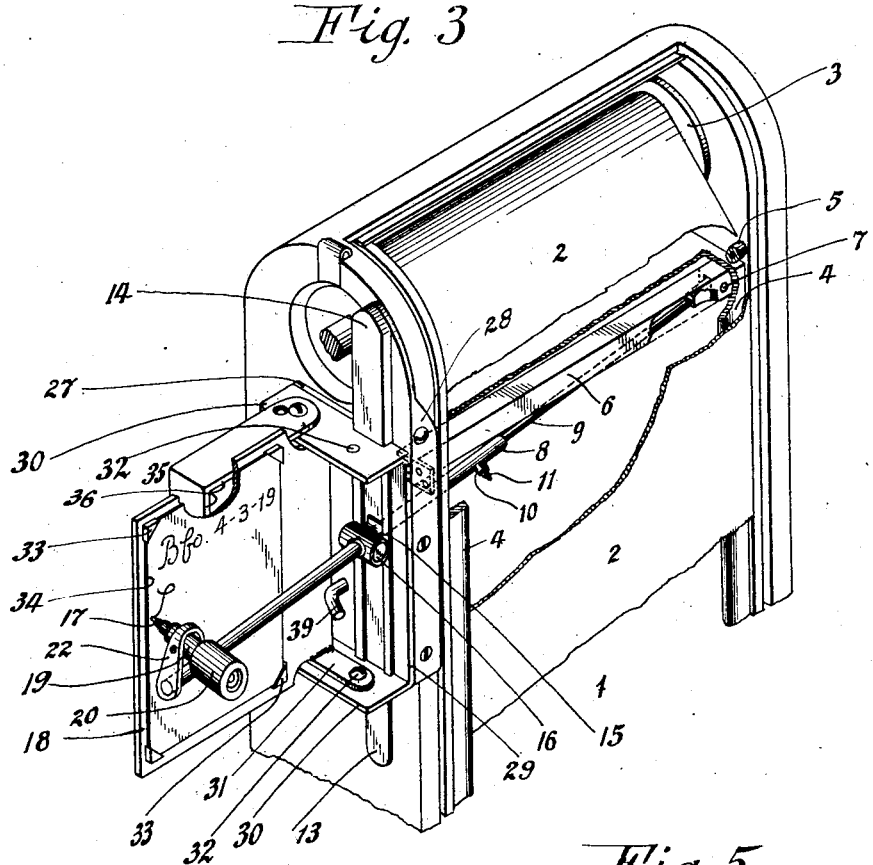
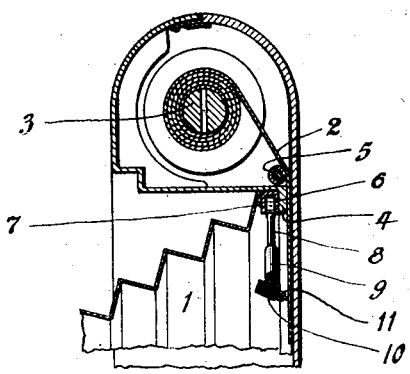
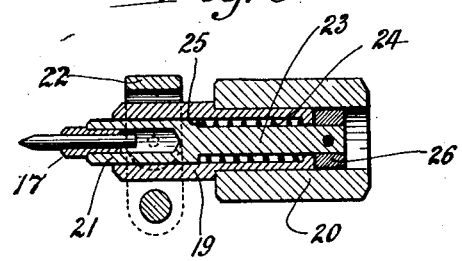
Inventor
Watson A. Brown,
by Guyer & Popp
Attorneys

UNITED STATES PATENT OFFICE.

WATSON A. BROWN, OF ROCHESTER, NEW YORK.

AUTOGRAPHIC CAMERA.

1,402,833.  Specification of Letters Patent.  Patented Jan. 10, 1922.

Application filed April 30, 1919. Serial No. 293,845.

*To all whom it may concern:*

Be it known that I, WATSON A. BROWN, a citizen of the United States, residing at Rochester, in the county of Monroe and State of New York, have invented new and useful Improvements in Autographic Cameras, of which the following is a specification.

This invention relates to photographic cameras having means for marking upon the film or plate, while in the camera, any desired record or data, so as to identify the negative after the development of the film and reproduce such record upon the prints made from the negative. The invention has more particular reference to an autographic device of this kind which comprises a pencil, tracer or other film-marking device located within the camera and a pencil or other stylographic device located on the outside of the camera and controlling the movements of the inside pencil.

One of the objects of my invention is the provision of a neat and compact housing for concealing and protecting those parts of the autographic device located on the outside of the camera, when not in use, and which permits ready access to the parts when it is desired to make inscriptions on the film or plate.

Another object of the invention is to provide a housing of this character which can be readily applied to existing cameras without material change of any of its parts.

A further object is to improve the construction of the autographing device with a view of simplifying its construction, rendering it convenient in use and reducing the liability of its getting out of order.

In the accompanying drawings:

Figure 1 is a fragmentary perspective view of an ordinary folding-camera equipped with the improvement, showing the housing folded. Figure 2 is a horizontal section through the housing, showing the same unfolded and the autographic parts in position for use. Figure 3 is a fragmentary perspective view of the camera, partly in section, with the parts in substantially the same position as that shown in Fig. 2. Figure 4 is a transverse vertical section of the upper part of the camera. Figure 5 is an exaggerated longitudinal section of the external or controlling pencil.

Similar characters of reference indicate corresponding parts throughout the several views.

In the drawings, the invention is shown in connection with an ordinary folding camera having the customary light-proof chamber 1 and containing sensitized material such as the film 2 wound upon the usual rolls, the upper one of which is shown at 3. The film passes over the usual open guide-frame 4 and guide rollers journaled at the upper and lower ends of said frame, the upper roller being shown at 5.

Arranged partly inside and partly outside of the light-proof chamber 1 and extending across the face of the film 2 is a vertically-swinging arm or lever which is preferably pivoted at its inner end to a supporting bar or bracket 6 secured to the contiguous upper part of the guide frame 4, the lever-pivot being shown at 7. This lever is extensible and preferably composed of telescopic sections 8, 9, the inner one of which is pivoted to said supporting bar, while the outer slidable section carries a suitable holder 10 adapted to receive an appropriate tracer or marker 11, such as a pencil point, as shown, which is adapted to make any desired record of inscription upon the sensitized surface of the film. The outer section 8 of the lever plays in a vertical slot 12 in the adjacent side wall of the camera case. This slot is closed in all positions of the lever by a vertical slide or light-excluding shutter 13 moving in a fixed guide 14. This shutter carries a horizontal bearing 15 in which is journaled a trunnion 16 having a transverse opening for the passage of the sliding lever section 8. The trunnion is closely fitted in the bearing but free to rock therein, in order to permit the lever to change its angular position relatively to the slide as these parts are moved up and down, and at the same time exclude light at this point.

Mounted on the projecting or exterior portion of said lever is a marking or stylographic device 17 of any appropriate construction adapted to be moved over a tablet or writing surface 18 and controlling the movements of the tracer or record pencil 11 in such manner that the latter reproduces upon the unexposed film the record or characters written upon the tablet. In the preferred construction shown in the drawings, this external marker consists of a tube 19 provided at its rear end with a handle 20 and at its front end with a holder 21 for the pencil point or marking device 17. This handle-tube is mounted to swivel or swing vertically in a yoke-shaped rock-arm 22 secured to the adjacent end of the lever-section 8, so that said marking device serves to rock or turn the said lever-section upon the inner section, in the proper direction to swing the tracer 11 against the film for inscribing the same, this rocking capacity allowing the tracer to be moved into or out of engagement with the film. By pivoting the outer marker-handle to the rock arm 22, said outer lever-section can be thus rocked while holding the marker in a convenient position.

If the internal and external markers were both rigidly mounted on the rocking lever-section 8, any imperfections of those parts or inaccuracies in their location on the lever might result in an imperfect contact or a lack of contact between the internal marker and the film. To compensate for such imperfections and dispense with adjusting devices, the pencil point of the external marker is preferably yieldable in its handle, or otherwise stated, the handle-tube 19 is movable independently of the pencil point in the direction of its length, so that in case this point touches the tablet 18 before the internal marker touches the film, the forward movement of that handle may be continued relative to its pencil point until the outer lever-section 8 is rocked to the necessary extent to press the internal marker against the film. In the embodiment of the improvement illustrated in the drawings, the holder 21 has a longitudinal stem 23 which slides in the handle tube 19, a spring 24 surrounding this stem between the closed rear end of the tube and a shoulder 25 of the stem and tending to project the latter. The forward movement of this stem is limited by a stop collar 26 secured to the rear end thereof.

It will be understood from the foregoing that inasmuch as the lever 8, 9, is extensible or movable longitudinally, as well as vertically, the external and internal markers have the necessary universal movement to produce any desired inscription upon the tablet and the film.

The telescopic construction of the lever together with the hinged construction of the outer marker permits these parts to be moved in close proximity to the side of the camera, when not in use, so as to present as small a projection as possible. These projecting or outside parts are concealed and protected by a hood or housing preferably constructed as follows:

27 indicates a supporting or base plate secured to the side-wall of the casing through which the extensible lever passes and having a flange 28 which is screwed or otherwise fastened to the front edge of said wall, as shown. This plate carries the guide 14 and the lever bracket 6. Secured to the face of this plate is the back-plate 29 of the housing which is provided at its upper and lower ends with outwardly-extending horizontal flanges 30 which form the top and bottom of the housing. Hinged to these top and bottom flanges is the tablet 18 which in its unfolded position stands substantially at right angles to the side wall of the camera, as shown by full lines in Figs. 2 and 3, and when folded, stands parallel with the back of the camera, so as to be out of the way and at the same time form a cover for the rear side of the housing, as shown in Fig. 1 and by dotted lines in Fig. 2. For this purpose, the tablet is provided near its inner edge with ears 31 extending forwardly at right angles to the tablet and hinged by pins 32 to the top and bottom flanges 30 at a suitable distance from the outer edges of said flanges. The user may write directly upon the face of this combined tablet and cover or it may be provided with holders 33 for a sheet 34 of celluloid, slate or other suitable material.

The outer side of the housing is normally closed by a cover 35 preferably hinged to swing horizontally. In the construction shown, this cover is provided at its top, bottom and outer edges with an inwardly-projecting rim 36, which in the closed position of the cover, overlaps the top and bottom flanges 30 of the back-plate and the hinged edge of the tablet. By this construction, the parts of the autographic device outside of the camera-case are practically enclosed by a neat and compact hood which does not detract from the appearance of the camera.

Upon unfolding the tablet to its operative position, the cover 35 is automatically unfolded by the engagement of the back of the tablet against the free edge of the cover. In order to cause this cover to close automatically when the tablet is folded, the cover is preferably provided with a spring hinge or hinges of any ordinary construction. In the example shown in the drawings, a spring 37 is coiled about the hinge-pintle of this cover, with one end attached to the cover and the other bearing against the back-plate of the housing. The inner edge of this cover is arranged to strike said back-plate when fully unfolded and it thus acts as a stop for the unfolded tablet. A suitable catch is employed to hold the cover in its unfolded position. The catch shown consists of a teat 35$^a$ stamped in the rim of the cover and arranged to snap into an opening 35$^b$ in the adjacent flange 30.

As shown in Figs. 1 and 2, the housing is located a sufficient distance below the usual operating handle 38 of the upper film-roll to permit its convenient manipulation. As shown in Figs. 2 and 3, the housing is provided with a stop 39 arranged to prevent the marker-handle 20 from assuming a position in which it might interfere with the folding of the tablet and the cover 35.

In the use of the autographic device, after unfolding the tablet 18, the user grasps the handle of the external marker 17 and makes on the tablet the desired record or inscription which is simultaneously reproduced upon the film by the internal marker or tracer 11, as hereinbefore described. By the act of bringing the pencil into contact with the tablet, the outer section 8 of the extensible lever is rocked to swing the tracer from its inoperative to its operative position against the film, thus requiring no particular care on the part of the user for this purpose.

All of the parts of the attachment are carried by the base-plate 27, including the lever bracket 6, and the device can therefore be readily applied to an existing camera by simply cutting the slot 12 in the side of the camera-case for the passage of that lever and securing said plate and bracket in place.

As the lever is fulcrumed at one end and the external marker is located at a greater distance from the fulcrum than the tracer, inscriptions can be made on the tablet in comparatively large and natural-sized characters without producing a correspondingly large and conspicuous reproduction upon the film. In the example shown, the outside marker is approximately twice as far from the fulcrum of the lever as the tracer, and the writing on the film will therefore be about half as large as that on the tablet.

The construction of this autographic attachment is such that records can be made on the top, bottom or side margins of the pictures.

While the invention is herein shown and described in connection with a photographic camera, it is also applicable to a light-proof box or casing containing sensitized material, for reproducing original writings, drawings or other matter.

I claim as my invention:

1. The combination with a camera case for enclosing a sensitized film, of an autographic recorder including a movable element outside of the camera-case and means inside of the case for reproducing the movements of said element upon the film, and a housing for said external element having a movable member capable of being unfolded to expose the same.

2. The combination with a camera case for enclosing a sensitized film, of an autographic recorder including a movable marking element outside of the camera-case and means inside of the camera for reproducing the movements of said elements upon the film, and a housing for said external element including a foldable tablet co-operating therewith.

3. The combination with a camera case for enclosing a sensitized film, of an autographic recorder including a movable element outside of the camera-case and means inside of the case for reproducing the movements of said element upon the film, and a housing for said external element having a swinging member provided with a writing surface, said last-mentioned member being foldable to close part of the housing and unfoldable to expose said writing surface.

4. The combination with a camera case for enclosing a sensitized film, of an autographic recorder including a movable element outside of the camera-case and means inside of the case for reproducing the movements of said element upon the film, and a housing for said external element arranged at one side of the camera-case.

5. The combination with a camera case for enclosing a sensitized film, of an autographic recorder including a movable element outside of the camera-case and means inside of the case for reproducing the movements of said element upon the film, and a housing for said external element arranged at one side of the camera case and including a foldable tablet pivoted to swing against the back of the case when folded and to project laterally from the case when unfolded.

6. The combination with a camera case for enclosing a sensitized film, of an autographic recorder including a movable element outside of the camera-case and means inside of the case for reproducing the movements of said element upon the film, and a housing for said external element arranged at one side of the camera-case, said housing including a swinging cover for closing the outer side of the housing and a second swinging cover foldable against the back of the camera-case and arranged to close the rear side of the housing when folded.

7. The combination with a camera case for enclosing a sensitized film, of an autographic recorder including a movable element outside of the camera-case and means inside of the case for reproducing the movements of said element upon the film, and a housing for said external element, including a foldable cover and a foldable tablet co-operating with said external element and engaging said cover to unfold the same when the tablet is unfolded.

8. The combination with a camera case for enclosing a sensitized film, of an autographic recorder including a movable element outside of the camera-case and means inside of the case for reproducing the movements of said element upon the film, and a housing for said external element including a foldable cover, automatic means for folding said cover, and a foldable tablet co-operating with said external element and engaging said cover to unfold it when the tablet is unfolded.

9. The combination with a camera case for enclosing a sensitized film, of an autographic recorder including a movable element outside of the camera-case and means inside of the case for reproducing the movements of said element upon the film, and a housing for said external element comprising a back-plate having top and bottom flanges projecting outwardly therefrom, and a tablet hinged to said flanges and foldable against the back of the camera-case and unfoldable to a position substantially at right angles to said back-plate.

10. The combination with a camera case for enclosing a sensitized film, of an autographic recorder including a movable element outside of the camera-case and means inside of the case for reproducing the movements of said element upon the film, a housing for said external element comprising a back-plate having top and bottom flanges projecting outwardly therefrom, a tablet hinged to said flanges and foldable against the back of the camera-case and unfoldable to a position substantially at right angles to said back-plate, and a cover hinged to said flanges on the front side of said tablet.

11. The combination with a camera-case for enclosing a sensitized film, of an autographic recorder including a movable element outside of the camera-case and means inside of the case for reproducing the movements of said element upon the film, a housing for said external element comprising a back-plate having top and bottom flanges projecting outwardly therefrom, a tablet hinged to said flanges and foldable against the back of the camera-case and unfoldable to a position substantially at right angles to said back-plate, and a cover also hinged to said flanges and having a rim arranged to overlap the hinged edge of said tablet.

12. The combination with a camera-case for enclosing a sensitized film, of an autographic recorder comprising a telescopic lever arranged partly inside and partly outside of the camera-case and adapted to extend across the film, said lever including a section capable of a compound rocking and sliding movement, a tracer for marking the film mounted on said rocking lever-section inside of the camera-case, and operating means for the rocking lever-section arranged outside of said case.

13. The combination with a camera-case for enclosing a sensitized film, of an autographic recorder comprising a telescopic lever arranged within the camera-case and projecting through a side thereof, said lever consisting of telescopic sections, the outer of which is capable of rocking on the inner one, a tablet arranged outside of the camera-case adjacent to the external part of said lever, a tracer for marking the film mounted on said rocking lever-section within the camera-case, and a stylographic device co-operating with said tablet and also mounted on the said rocking section.

14. The combination with a camera-case for enclosing a sensitized film, of an autographic recorder, comprising a telescopic lever adapted to extend across the film and fulcrumed at one end within the camera-case, said lever having an extensible and rocking section passing through the side of the camera-case, a tracer for marking the film mounted on said rocking lever-section inside of the camera-case, and operating means for said rocking section arranged outside of said case.

15. The combination with a camera-case for enclosing a sensitized film, of an autographic recorder, comprising a telescopic lever arranged within the camera-case and extending through the side thereof, said lever having an extensible and rocking section provided outside of the camera-case with a rock-arm, a tracer for marking the film mounted on said rocking lever-section within the camera-case, and a marking device carried by said rock-arm.

16. The combination with a camera-case for enclosing a sensitized film, of an autographic recorder comprising a telescopic lever pivoted to swing lengthwise of the film and having a sliding and rocking section extending outside of the camera-case, said rocking section having a rock-arm exterior of said case and a marking device carried by said arm and pivoted to swing vertically thereon.

17. The combination with a camera-case for enclosing a sensitized film, of an autographic recorder comprising a rock-member movable vertically and laterally of the film and extending outside of the camera-case, said member being capable of rocking on its longitudinal axis the external part of said rock member carrying a rock-arm, a tracer for marking the film mounted on said rock member within the camera-case, and a marking device connected to said arm.

18. The combination with a camera-case for enclosing a sensitized film, of an autographic recorder comprising a rock member movable vertically and laterally of the film and extending outside of the camera-case, the external part of said rock member carrying a rock-arm, a tracer for marking the film mounted on said rock member within the camera-case, a handle attached to said rock-arm, and a marking device carried by said handle and yieldable lengthwise thereof.

19. The combination with a camera-case for enclosing a sensitized film and having a slot in its side, of an autographic recorder comprising a lever pivoted within the camera-case and extending through said slot, a light-excluding shutter applied to said slot and movable with said lever, a film-marker carried by the portion of said lever within the camera-case, and controlling means for said lever arranged on the outside of the case.

20. The combination with a camera-case for enclosing a sensitized film and having a slot in its side, of an autographic recorder comprising a lever pivoted within the camera-case and extending through said slot, a light-excluding shutter applied to said slot and movable with said lever, said shutter carrying a bearing, a trunnion journaled in said bearing and having an opening for the passage of said lever, a film-marker carried by the portion of the lever within the camera-case, and controlling means for said lever arranged on the outside of the case.

21. An attachment for an autographic camera, comprising a base-plate adapted to be attached to the camera-case, a lever-bracket extending from the back of said plate, and a housing for parts of the attachment mounted on the front side of said plate.

22. An attachment for an autographic-camera, comprising a base-plate adapted to be attached to the camera-case, and a housing for parts of the attachment mounted on said plate and including a foldable tablet.

23. An attachment for an autographic-camera, comprising a base-plate adapted to be attached to the camera-case, and a housing for parts of the attachment mounted on said plate including a foldable tablet applied to one side of the housing and a foldable cover applied to another side of the housing.

24. An attachment for an autographic camera, comprising a base-plate adapted to be attached to the camera-case, and a housing for parts of the attachment mounted on said plate and including a foldable tablet applied to one side of the housing and having a foldable member forming a wall of the housing and provided with a writing surface.

25. An attachment for an autographic camera, comprising a base-plate adapted to be attached to the camera-case, and a housing for parts of the attachment mounted on said plate and having a foldable cover and a foldable tablet engaging said cover to unfold it when the tablet is unfolded.

26. An attachment for an autographic camera, comprising a base-plate adapted to be attached to the camera-case, and a housing for parts of the attachment mounted on said plate and having a foldable cover, a spring tending to fold said cover, and a foldable tablet engaging said cover to unfold it when the tablet is unfolded.

27. An attachment for an autographic camera, comprising a base-plate adapted to be attached to the camera-case, and a housing for parts of the attachment mounted on said plate and having a foldable cover, a spring tending to fold said cover, a foldable tablet engaging said cover to unfold it when the tablet is unfolded, and a catch for holding said cover in its unfolded position.

28. The combination with a camera-case for enclosing a sensitized film, of an autographic recorder comprising a rock member movable vertically and laterally of the film and extending outside of the camera-case, the external part of said rock member carrying a rock-arm, a tracer for marking the film mounted on said rock member within the camera-case, a handle pivoted to said rock arm to swing vertically thereon, a stem slidable lengthwise in said handle and carrying a marking point, and a backing spring tending to project said stem.

29. The combination with a camera-case for enclosing a sensitized film, of an autographic recorder comprising a member movable toward and from the face of the film, a marking pencil for the film carried by said movable member, and controlling means for said movable member arranged outside of the camera.

30. The combination with a camera case for enclosing a sensitized film and provided in its wall with an elongated opening, of an autographic recorder comprising a universally-movable member extending through said opening, a tracer for marking the film mounted on said movable member within the camera-case, and controlling means for said movable member arranged outside of said case.

31. The combination with a camera-case for enclosing a sensitized film and having an external writing surface, of an autographic recorder comprising a writing device arranged outside of the camera case and co-operating with said writing surface and a marking pencil within the case, movable against and away from the film and responsive to the movements of said writing device.

32. The combination with a camera-case for enclosing a sensitized film, of an autographic recorder, comprising a universally-movable marking point arranged inside of the camera-case and movable on and off the film, and controlling means for said marking point arranged outside of the camera-case and operatively connected therewith.

WATSON A. BROWN.